United States Patent
Akiyama et al.

(10) Patent No.: US 10,942,091 B2
(45) Date of Patent: Mar. 9, 2021

(54) CONTROL DEVICE OF DYNAMOMETER SYSTEM

(71) Applicant: MEIDENSHA CORPORATION, Tokyo (JP)

(72) Inventors: Takao Akiyama, Tokyo (JP); Tomoaki Kimura, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/969,121

(22) PCT Filed: Dec. 11, 2018

(86) PCT No.: PCT/JP2018/045495
§ 371 (c)(1),
(2) Date: Aug. 11, 2020

(87) PCT Pub. No.: WO2019/159517
PCT Pub. Date: Aug. 22, 2019

(65) Prior Publication Data
US 2021/0010903 A1  Jan. 14, 2021

(30) Foreign Application Priority Data
Feb. 13, 2018  (JP) .............................. JP2018-022771

(51) Int. Cl.
*G01M 17/00* (2006.01)
*G01M 17/007* (2006.01)

(52) U.S. Cl.
CPC .............................. *G01M 17/0072* (2013.01)

(58) Field of Classification Search
CPC ......... G01M 17/0072; G01M 17/0074; G01M 17/0076
(Continued)

(56) References Cited

U.S. PATENT DOCUMENTS

| 2015/0219529 A1* | 8/2015 | Akiyama ............ G01M 13/025 73/115.01 |
| 2015/0227119 A1 | 8/2015 | Nishida |
| 2020/0271539 A1* | 8/2020 | Akiyama ............. G01M 13/02 |

FOREIGN PATENT DOCUMENTS

| JP | H04-190132 A | 7/1992 |
| JP | H04-285838 A | 10/1992 |

(Continued)

OTHER PUBLICATIONS

Maeda, Hajime, "Linear system (popular edition" (non-official translation), Asakura Publishing Co., Ltd., Jun. 25, 2012, pp. 57-60.
(Continued)

*Primary Examiner* — Eric S. McCall
(74) *Attorney, Agent, or Firm* — Muncy, Geissler, Olds & Lowe, P.C.

(57) ABSTRACT

A control device of a dynamometer system is provided with: a driving force observer which estimates a generated driving force of a vehicle; an electrical inertia control unit which uses the driving force to generate a front wheel basic torque command signal and a rear wheel basic torque command signal; a synchronization control unit which generates a synchronization control torque command signal with respect to the basic torque command signal and the basic torque command signal in such a way as to eliminate a speed difference; and torque command signal generating units which use the synchronization control torque command signal to adjust the basic torque command signal and the basic torque command signal. The synchronization control unit is defined in such a way that the poles of a denominator polynomial of a transfer function from the driving force to the speed difference are all negative real numbers.

3 Claims, 4 Drawing Sheets

(58) Field of Classification Search
USPC ............... 73/116.05, 116.06, 116.07, 118.01, 73/118.02
See application file for complete search history.

(56) References Cited

FOREIGN PATENT DOCUMENTS

| | | |
|---|---|---|
| JP | H07-020006 A | 1/1995 |
| JP | 2007-285903 A | 11/2007 |
| JP | 2009-074834 A | 4/2009 |
| JP | 2010-071771 A | 4/2010 |
| JP | 2010-197129 A | 9/2010 |
| JP | 2014-081822 A | 5/2014 |

OTHER PUBLICATIONS

International Search Report (with English translation) and Written Opinion dated Feb. 12, 2019 issued in corresponding Application No. PCT/JP2018/045495.
Notice of Reasons for Rejection dated Feb. 12, 2019 issued in Japan Application No. 2018-022771, 5 pages.
Notice of Decision to Grant a Patent dated Apr. 9, 2019 issued to Japan Application No. 2018-022771, 3 pages.

\* cited by examiner

CONTROL DEVICE OF DYNAMOMETER SYSTEM

TECHNICAL FIELD

The present invention relates to a control device of a dynamometer system. More specifically, the present invention relates to a control device of a chassis dynamometer system that includes a front wheel roller and a rear wheel roller on which the front wheel and the rear wheel of a vehicle are placed respectively and separately.

BACKGROUND ART

In a vehicle test such as a durability test, an exhaust purification performance evaluation test or a fuel consumption measurement test, a chassis dynamometer system is used. The chassis dynamometer system includes a roller on which a wheel of a vehicle serving as a test target is placed and a dynamometer which is coupled to this roller, and traveling resistance such as rolling resistance or inertial resistance produced at the time of actual traveling is provided to the vehicle travelling on the roller by use of the dynamometer and the roller, with the result that conditions close to actual traveling conditions are realized.

On the assumption that such a chassis dynamometer system is mainly used in a so-called four-wheel drive vehicle which transmits power to the front and rear wheels of the four-wheel vehicle, a chassis dynamometer system is proposed where a front wheel roller on which the front wheel of a vehicle is placed and a rear wheel roller on which the rear wheel is placed are driven with separate dynamometers (see, for example, Patent Document 1).

When a four-wheel vehicle travels on an actual road surface in a non-slip state, the speed of front wheels and the speed of rear wheels are equal to each other. However, in the chassis dynamometer system for a four-wheel drive vehicle as described above, the front wheel roller and the rear wheel roller are independently driven without being mechanically coupled to each other, and thus a difference may be produced between the speed of the front wheel roller and the speed of the rear wheel roller. Hence, in the chassis dynamometer system for a four-wheel drive vehicle, synchronization control is performed in which the speed of the front wheel roller and the speed of the rear wheel roller are made equal to each other (see, for example, Patent Document 2).

In a chassis dynamometer system for a four-wheel drive vehicle disclosed in Patent Document 2, synchronization control is performed in which current command signals that are supplied to the inverters of front and rear wheel dynamometers coupled to individual rollers are corrected according to a speed difference between the front and rear wheel rollers and the polarities thereof, and in which thus the speeds of the front and rear wheel rollers are made equal to each other. In Patent Document 2, a technology is proposed in which in order to enhance the performance of the synchronization control, a synchronization control gain in the synchronization control is adjusted by the magnitude of the standard deviation of the speed difference.

Patent Document 1: Japanese Unexamined Patent Application, Publication No. 2007-285903
Patent Document 2: Japanese Unexamined Patent Application, Publication No. 2010-71771

DISCLOSURE OF THE INVENTION

Problems to be Solved by the Invention

FIG. 4 is a diagram showing changes in the front wheel speed and the rear wheel speed (upper row) and in the speed difference of the front and rear wheels (lower row) when the synchronization control is performed by the method proposed in Patent Document 2. More specifically, in the example of FIG. 4, a vehicle which generates a driving force in only the front wheel is used, and the synchronization control is performed such that by the method of Patent Document 2, a dynamometer on the side of the rear wheel is rotated at the same speed as a dynamometer on the side of the front wheel.

In the synchronization control method proposed in Patent Document 2, consideration is not given to the fixed moment of inertia of the chassis dynamometer system. Hence, as shown in FIG. 4, a control response may be oscillatory. A certain level of difference is allowed to be produced by the control response between the front wheel speed and the rear wheel speed. However, in a vehicle traveling on a road surface which is generally assumed, oscillation is prevented from occurring in a speed difference between front and rear wheels, and thus oscillation which cannot occur on an actual road may be provided to the vehicle on the rollers.

An object of the present invention is to provide a control device of a chassis dynamometer system which can make the speeds of individual wheels equal to each other without providing an oscillatory behavior to a speed difference between the two wheels.

Means for Solving the Problems (1) A dynamometer system (for example, a dynamometer system S which will be described later) includes: a first driven member (for example, a front wheel roller 1f which will be described later) and a second driven member (for example, a rear wheel roller 1r which will be described later) on which a first wheel (for example, a front wheel Wf which will be described later) and a second wheel (for example, a rear wheel Wr which will be described later) of a vehicle (for example, a vehicle V which will be described later) are respectively placed and which are respectively driven by rotations of the first wheel and the second wheel; a first dynamometer (for example, a front wheel dynamometer 2f which will be described later) and a second dynamometer (for example, a rear wheel dynamometer 2r which will be described later) which are respectively coupled to the first and second driven members; and a first speed sensor (for example, a front wheel speed sensor 3f which will be described later) and a second speed sensor (for example, a rear wheel speed sensor 3r which will be described later) which respectively detect the speeds of the first and second dynamometers. The control device (for example, a control device 6 which will be described later) of the dynamometer system includes: a driving force estimator (for example, a driving force observer 61 which will be described later) which estimates the generated driving force of the vehicle; a torque command signal generator (for example, an electrical inertia control unit 62 which will be described later) which generates a first torque command signal (Ff_bs) for the first dynamometer and a second torque command signal (Fr_bs) for the second dynamometer using the generated driving force (Fv) that is estimated by the driving force estimator; a synchronization correction signal generator (for example, a synchronization control unit 63 which will be described later) which generates a first torque correction signal (-Fd) for the first torque command signal and a second torque correction signal (Fd) for the second torque command signal so as to eliminate a speed difference (vf−vr) between a first speed (vf) detected with the first speed sensor and a second speed (vr) detected with the second speed sensor; a first torque command corrector (for example, a front wheel torque command signal generator 64f which will be described later) which corrects the first torque command signal using the first torque correction signal; and a second torque command corrector (for example, a rear wheel torque command signal generator 64r which will be described later) which corrects the second torque command signal using the second torque correction signal, and the synchronization correction signal generator is defined such that all poles of a denominator polynomial in a transfer function from the generated driving force to the speed difference are negative real numbers.

(2) Preferably, in this case, a transfer function Gd(s) from the speed difference to the first torque correction signal and the second torque correction signal in the synchronization correction signal generator is provided with a first synchronization control gain Kp and a second synchronization control gain Ti by formula (1) below, and the first synchronization control gain Kp and the second synchronization control gain Ti are defined such that all the poles of the denominator polynomial in the transfer function from the generated driving force to the speed difference are negative real numbers.

$$Gd(s) = Kp \cdot \frac{Ti \cdot s + 1}{Ti \cdot s} \quad (1)$$

(3) Preferably, in this case, the first synchronization control gain Kp and the second synchronization control gain Ti are provided with inertia Mf resulting from addition of the first driven member and the first dynamometer, inertia Mr resulting from addition of the second driven member and the second dynamometer and an arbitrary control response frequency ωc by formulas (2-1) and (2-2) below.

$$Kp = \frac{2 \cdot Mf \cdot Mr \cdot \omega c}{Mf + Mr} \quad (2\text{-}1)$$

$$Ti = \frac{2}{\omega c} \quad (2\text{-}2)$$

Effects of the Invention (1) The driving force estimator estimates the generated driving force of the vehicle, and the torque command signal generator uses the generated driving force which is estimated so as to generate the first and second torque command signals for the first and second dynamometers. The synchronization correction signal generator generates the first and second torque correction signals so as to eliminate the speed difference between the first speed and the second speed, and the first and second torque command correctors use the first and second torque correction signals so as to correct the first and second torque command signals. In this way, in the control device of the present invention, while an appropriate load corresponding to the generated driving force of the vehicle is being provided to the vehicle on which the first and second driven members are placed, the first wheel and the second wheel of the vehicle can be synchronized such that the speeds thereof are made equal to each other. In the control device of the present invention, the synchronization correction signal generator is set such that all the poles of the denominator polynomial in the transfer function from the generated driving force to the speed difference are negative real numbers, that is, that all the poles are not oscillatory. In the control device of the present invention, the synchronization correction signal generator set as described above is used so as to generate the first and second torque correction signals, and thus it is possible to prevent the occurrence of an oscillatory behavior in the speed difference between the first speed and the second speed as a control response to the generated driving force that is generated in the vehicle on which the first and second driven members are placed.

(2) In the control device of the present invention, the speed difference is input to the transfer function Gd(s) specified by formula (1) above using the two synchronization control gains Kp and Ti so as to generate the first torque correction signal and the second torque correction signal, and these two synchronization control gains Kp and Ti are set such that all the poles of the denominator polynomial in the transfer function from the generated driving force to the speed difference are negative real numbers. In this way, it is possible to rapidly eliminate the speed difference while an oscillatory behavior is being prevented from occurring in the speed difference between the first speed and the second speed for the generated driving force which is input from the vehicle to the first and second driven members.

(3) In the control device of the present invention, the two synchronization control gains Kp and Ti are set with the inertia Mf and the inertia Mr which can be previously measured and the control response frequency ωc which can be arbitrarily set by formulas (2-1) and (2-2) above. These formulas (2-1) and (2-2) are one of such solutions that all the poles of the denominator polynomial described above are negative real numbers. Hence, in the control device of the present invention, it is possible to eliminate the speed difference between the first speed and the second speed with the response speed corresponding to the control response frequency ωc which can be arbitrarily set while an oscillatory behavior is being prevented from occurring in the speed difference.

PREFERRED MODE FOR CARRYING OUT THE INVENTION

Figure 1:
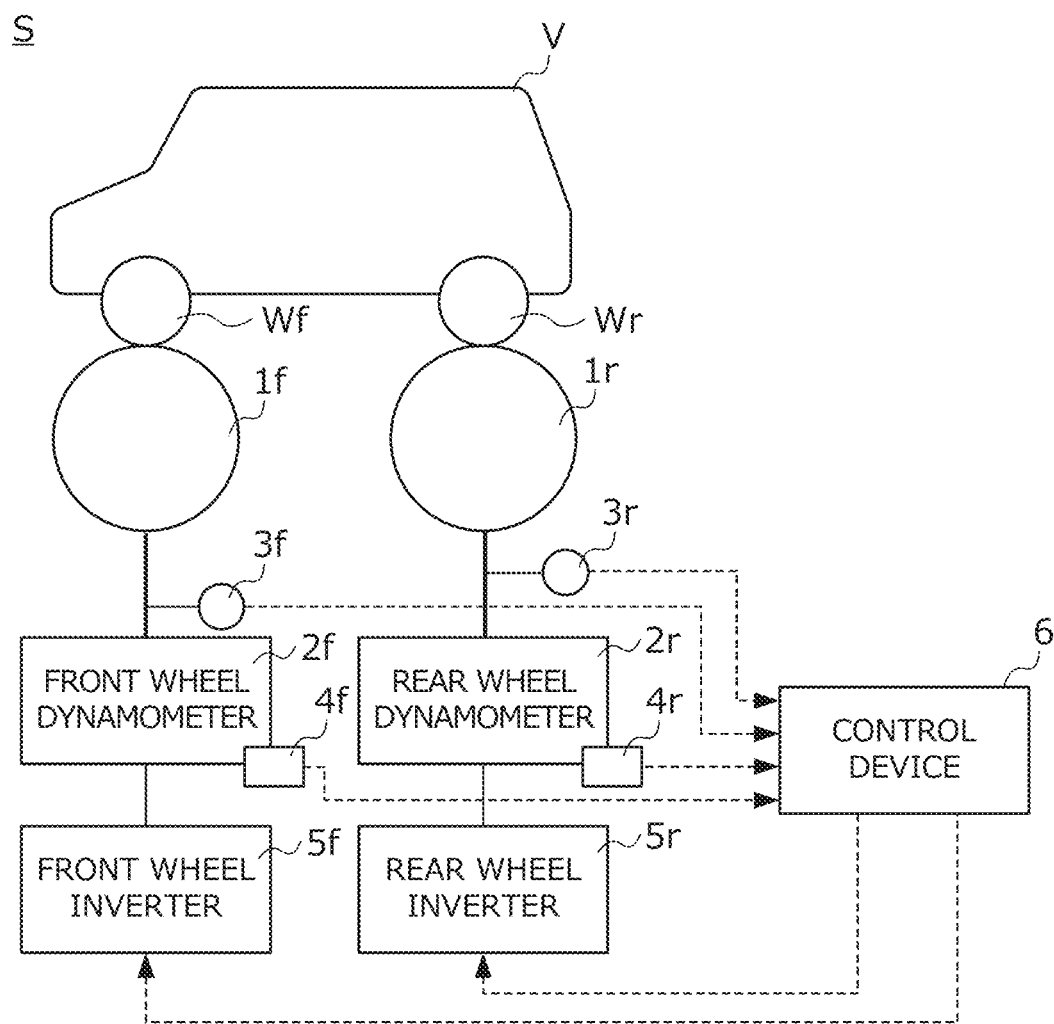
FIG. 1 is a diagram showing the configurations of a dynamometer system and a control device thereof according to an embodiment of the present invention.

An embodiment of the present invention will be described below with reference to drawings. FIG. 1 is a diagram showing the configurations of a chassis dynamometer system S and a control device 6 thereof according to the present embodiment. Although the test target vehicle V of the chassis dynamometer system S is a four-wheel drive (4 WD) vehicle which separates and transmits the power thereof to a front wheel Wf and a rear wheel Wr, the present invention is not limited to the four-wheel drive vehicle. The test target vehicle V may be a front-wheel drive (FWD) vehicle or a rear-wheel drive (RWD) vehicle.

The chassis dynamometer system S includes: a front wheel roller $1f$ and a rear wheel roller $1r$ on which the front wheel Wf and the rear wheel Wr of the vehicle V are respectively placed and which are rotated according to the rotations thereof; a front wheel dynamometer $2f$ and a rear wheel dynamometer $2r$ which are coupled to these rollers $1f$ and $1r$ respectively and coaxially; a front wheel speed sensor $3f$ and a rear wheel speed sensor $3r$ which respectively detect the rotation speeds of the dynamometers $2f$ and $2r$; a front wheel torque sensor $4f$ and a rear wheel torque sensor $4r$ which respectively detect the torques of the dynamometers $2f$ and $2r$; a front wheel inverter $5f$ and a rear wheel inverter $5r$ which respectively supply power to the dynamometers $2f$ and $2r$; and a control device 6 which uses the outputs of the speed sensors $3f$ and $3r$ and the torque sensors $4f$ and $4r$ and the like so as to generate front wheel and rear wheel torque command signals equivalent to commands for the torques generated in the dynamometers $2f$ and $2r$ and to input them to the inverters $5f$ and $5r$.

Figure 2:
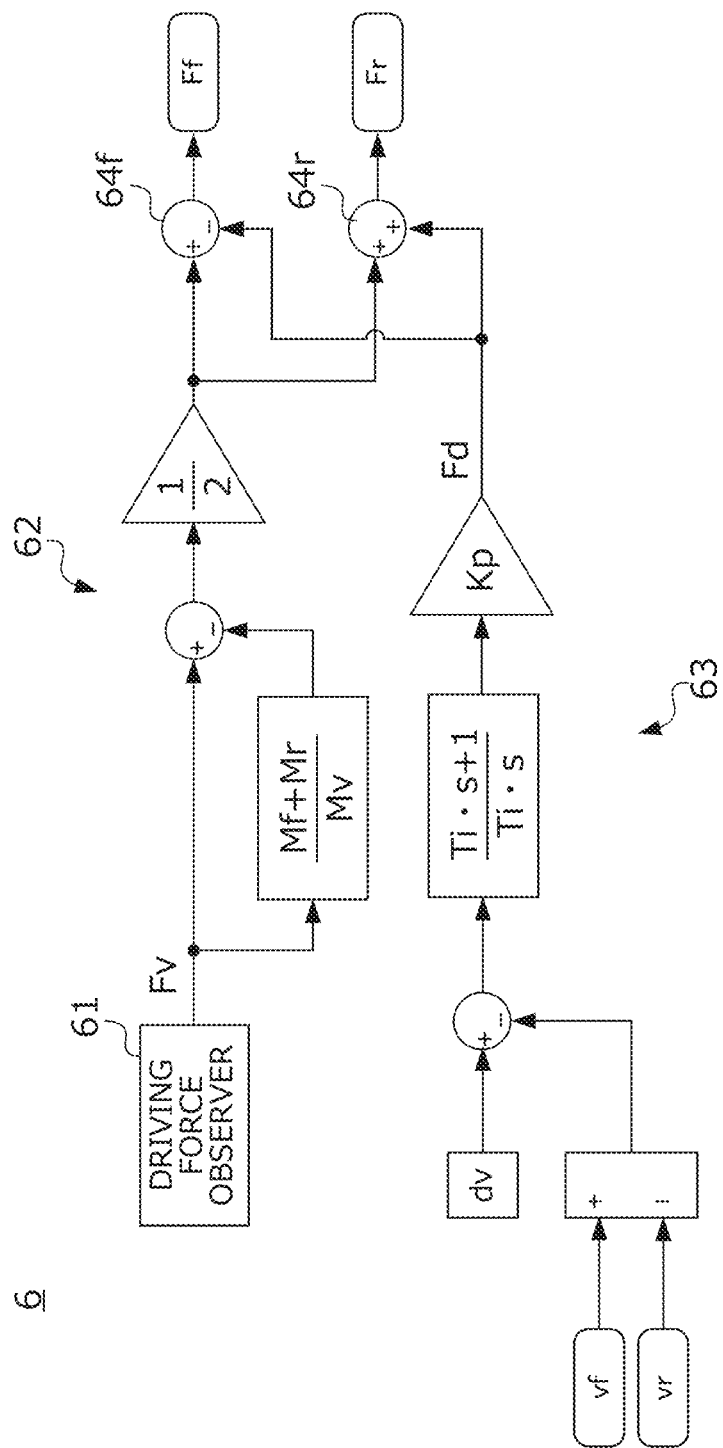
FIG. 2 is a diagram showing the configuration of the control device according to the embodiment.

FIG. 2 is a diagram showing the configuration of the control device 6. The control device 6 includes a driving force observer 61, an electrical inertia control unit 62, a synchronization control unit 63, a front wheel torque command signal generator $64f$ and a rear wheel torque command signal generator $64r$.

The driving force observer 61 uses a front wheel speed vf [m/s] and a rear wheel speed [m/s] detected with the front wheel and rear wheel speed sensors and the front wheel dynamometer torque and the rear wheel dynamometer torque detected with the front wheel and rear wheel torque sensors so as to estimate the generated driving force Fv [N] of the vehicle V equivalent to a driving force transmitted from the vehicle to the front wheel roller and the rear wheel roller. More specifically, the driving force observer 61 uses, for example, a mechanical system model formed with rollers on which the wheels are placed and the dynamometers coupled through shafts to the rollers so as to estimate a front wheel driving force Fvf transmitted from the front wheel of the vehicle to the front wheel roller and a rear wheel driving force Fvr transmitted from the rear wheel of the vehicle to the rear wheel roller, and adds up the front wheel driving force Fvf and the rear wheel driving force Fvr so as to estimate the generated driving force Fv.

The electrical inertia control unit 62 uses the generated driving force Fv of the vehicle V estimated with the driving force observer 61 so as to calculate, through the front wheel and rear wheel rollers, electrical inertia resistance Fin [N] provided to the vehicle, and uses the electrical inertia resistance so as to generate a front wheel basic torque command signal Ff_bs [N] equivalent to a basic value on a front wheel torque command signal Ff [N] for the front wheel dynamometer and a rear wheel basic torque command signal Fr_bs [N] equivalent to a basic value on a rear wheel torque command signal Fr [N] for the rear wheel dynamometer. More specifically, the electrical inertia control unit 62 sets, to the electrical inertia resistance Fin, a difference between the generated driving force Fv and a value obtained by multiplying the generated driving force Fv by a ratio between a sum of front side mechanical inertia Mf [kg] resulting from the addition of the inertial [kg] of the front wheel dynamometer and the inertial [kg] of the front wheel roller and rear side mechanical inertia Mr [kg] resulting from the addition of the inertial [kg] of the rear wheel dynamometer and the inertial [kg] of the rear wheel roller and vehicle inertia Mv [kg]. In other words, Fin=(1−Mf+Mr)/Mv)×Fv. The electrical inertia control unit 62 divides the electrical inertia resistance Fin by 2 so as to generate the front wheel and rear wheel basic torque command signals Ff_bs and Fr_bs. Here, as the specific values of the vehicle inertia Mv, the front side mechanical inertia Mf and the rear side mechanical inertia Mv, values which are individually identified by previously performing tests are used.

The synchronization control unit 63 uses the front wheel speed vf and the rear wheel speed vr so as to generate a synchronization control torque command signal Fd [N] equivalent to such correction signals for the front wheel and rear wheel basic torque command signals Ff_bs and Fr_bs as to eliminate a speed difference (vf−vr) therebetween.

More specifically, the synchronization control unit 63 subtracts the speed difference (vf−vr) from a predetermined speed difference command dv so as to calculate a deviation input ev. Here, the speed difference command dv is equivalent to a command value for the speed difference (Vf−Vr) between the front wheel speed vf and the rear wheel speed vr. Although a case where in order to perform control such that the speed difference is zero, the value of the speed difference command dv is set to zero will be described below, the present invention is not limited to this case. For example, when a clutch test, a differential gear test or the like is performed, a speed difference may be intentionally provided between the front wheel speed and the rear wheel speed (or a left wheel speed and a right wheel speed). Hence, when the speed difference is intentionally provided as described above, the value of the speed difference command dv is set to a value other than zero.

In the synchronization control unit 63, an output obtained by inputting the deviation input ev to a transfer function Gd(s) defined with a predetermined first synchronization control gain Kp and a predetermined second synchronization control gain Ti by formula (3) below is set to the synchronization control torque command signal Fd.

$$Gd(s) = Kp \cdot \frac{Ti \cdot s + 1}{Ti \cdot s} \quad (3)$$

Here, the first and second synchronization control gains Kp and Ti are defined such that all the poles of a denominator polynomial in a transfer function from the generated driving force Fv to the speed difference (vf−vr) are negative real numbers. More specifically, as the values of the first and second synchronization control gains Kp and Ti, values which are calculated with an arbitrary control response frequency ωc [rad], the front side mechanical inertia Mf and the rear side mechanical inertia Mr by formulas (4-1) and (4-2) below are used. As will be verified later, the first and second synchronization control gains Kp and Ti set according to formulas (4-1) and (4-2) below are one of such solutions that all the poles of the denominator polynomial are negative real numbers. Here, the control response frequency ωc is set by an operator to an arbitrary positive real value.

$$Kp = \frac{2 \cdot Mf \cdot Mr \cdot \omega c}{Mf + Mr} \quad (4\text{-}1)$$

$$Ti = \frac{2}{\omega c} \quad (4\text{-}2)$$

The front wheel command corrector 64f uses the synchronization control torque command signal Fd so as to correct the front wheel basic torque command signal Ff_bs, and thereby generates the front wheel torque command signal Ff. More specifically, the front wheel command corrector 64f sets, to the front wheel torque command signal Ff, a signal obtained by subtracting the synchronization control torque command signal Fd from the front wheel basic torque command signal Ff_bs.

The rear wheel command corrector 64r uses the synchronization control torque command signal Fd so as to correct the rear wheel basic torque command signal Fr_bs, and thereby generates the rear wheel torque command signal Fr. More specifically, the rear wheel command corrector 64r sets, to the rear wheel torque command signal Fr, a signal obtained by adding the synchronization control torque command signal Fd to the rear wheel basic torque command signal Fr_bs.

Then, it will be verified that in the chassis dynamometer system S and the control device 6 thereof configured as described above, the first and second synchronization control gains Kp and Ti set according to formulas (4-1) and (4-2) above are one of such solutions that all the poles of the denominator polynomial are negative real numbers.

First, when the front-to-rear distribution ratio of the generated driving force Fv is assumed to be k (that is, front wheel : rear wheel =k:1−K), the equation of motion of a front side system including the front side mechanical inertia Mf and the equation of motion of a front side system including the rear side mechanical inertia Mr are respectively represented by formulas (5-1) and (5-2) below.

$$Mf \cdot s \cdot vf = Fv \cdot k - Ff \quad (5\text{-}1)$$

$$Mr \cdot s \cdot vr = Fv \cdot (1-k) - Fr \quad (5\text{-}2)$$

In the control device 6, the front wheel torque command signal Ff and the rear wheel torque command signal Fr are respectively represented by formulas (6-1) and (6-2) below when it is assumed that a primary delay characterized by a predetermined time constant Tf which is a positive real number exists in the electrical inertia control unit 62.

$$Ff = \frac{1}{2} \cdot \left(1 - \frac{Mf + Mr}{Mv}\right) Fv \cdot \frac{1}{Tf \cdot s + 1} - Fd \quad (6\text{-}1)$$

$$Fr = \frac{1}{2} \cdot \left(1 - \frac{Mf + Mr}{Mv}\right) Fv \cdot \frac{1}{Tf \cdot s + 1} + Fd \quad (6\text{-}2)$$

When the value of the speed difference command dv is set to zero, the synchronization control torque command signal Fd is represented by formula (7) below.

$$Fd = -Kp \cdot \frac{Ti \cdot s + 1}{Ti \cdot s} \cdot (vf - vr) \quad (7)$$

When these five formulas are used, formula (8) below for a denominator polynomial D(s) in a transfer function ((vf−vr)/Fv) of a speed difference (vf−vr) for the generated driving force Fv is obtained.

$$D(s) = (Tf \cdot s + 1)\left\{\frac{Mf \cdot Mr \cdot Ti \cdot s^2}{(Mf + Mr) \cdot Kp} + Ti \cdot s + 1\right\} \quad (8)$$

Since on the right side of the denominator polynomial (8), Tf is a positive real number, the term of "Tf·s+1" provides the pole of a negative real number so as not to be oscillatory. When the first and second synchronization control gains Kp and Ti are set according to formulas (4-1) and (4-2) above, on the right side of the denominator polynomial (8), the term other than "Tf·s+1" is (s/ωc+1)². Hence, it is verified that in the control device 6 described above, the first and second synchronization control gains Kp and Ti are set according to, for example, formulas (4-1) and (4-2) above, and that thus it is defined that all the poles of the denominator polynomial (8) in the transfer function from the generated driving force Fv to the speed difference (vf−vr) are negative real numbers.

In the control device 6 according to the present embodiment, the following effects are achieved.

(1) The driving force observer 61 estimates the generated driving force Fv of the vehicle V, and the electrical inertia control unit 62 uses the generated driving force Fv so as to generate the front wheel and rear wheel basic torque command signals Ff_bs and Fr_bs. The synchronization control unit 63 generates the synchronization control torque command signal Fd so as to eliminate the speed difference (vf−vr), and the front wheel and rear wheel torque command signal generators 64f and 64r use the synchronization control torque command signal Fd so as to correct the front wheel and rear wheel basic torque command signals Ff_bs and Fr_bs, and thereby generates the front wheel and rear wheel torque command signals Ff and Fr. In this way, in the control device 6 and the chassis dynamometer system S, while an appropriate load corresponding to the generated driving force Fv of the vehicle is being provided to the vehicle V placed on the front wheel and rear wheel rollers 1f and 1r, the front wheel Wf and the rear wheel Wr of the vehicle V can be synchronized such that the speeds thereof are made equal to each other.

Figure 3:
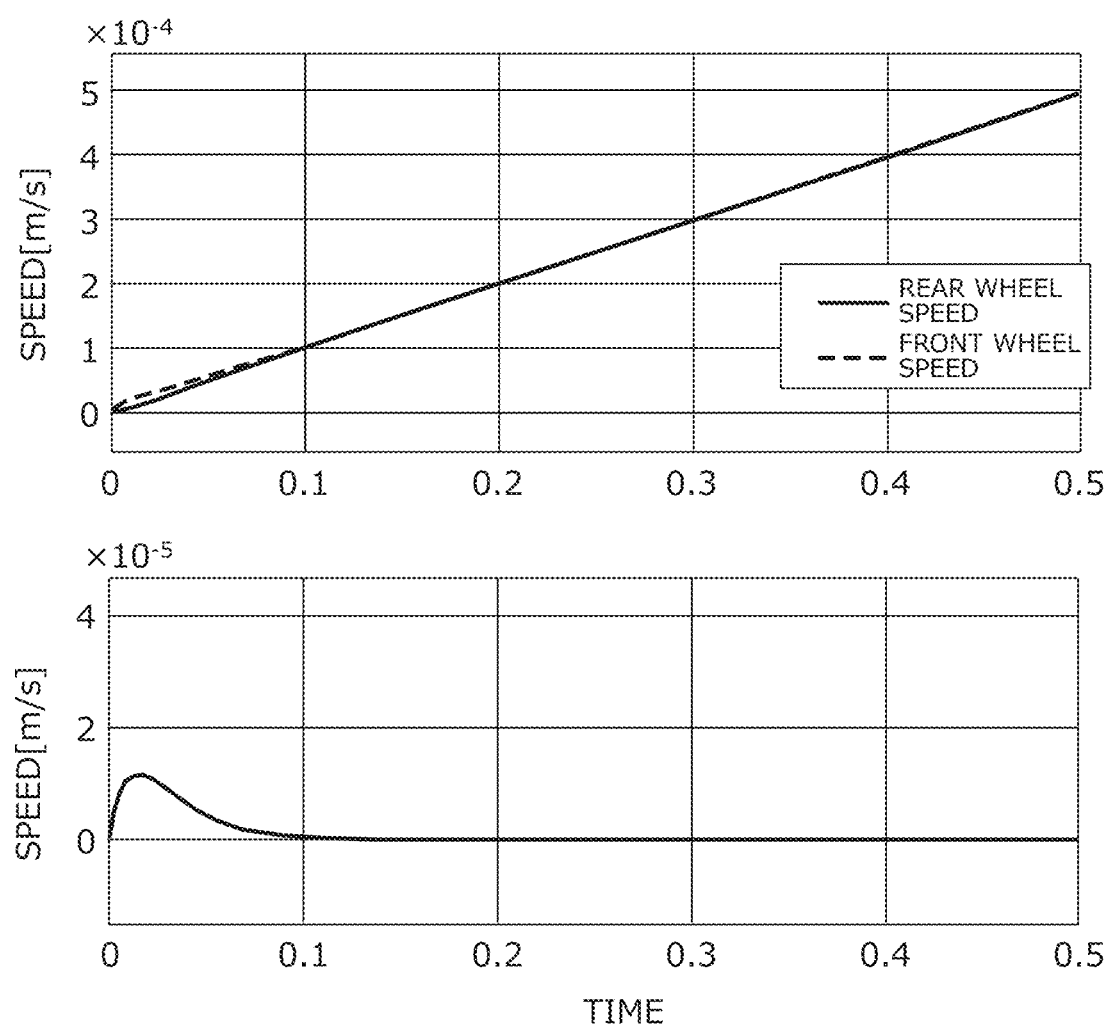
FIG. 3 is a diagram showing changes in a front wheel speed and a rear wheel speed (upper row) and in a speed difference between them (lower row) when synchronization control is performed with the control device according to the present embodiment.
Figure 4:
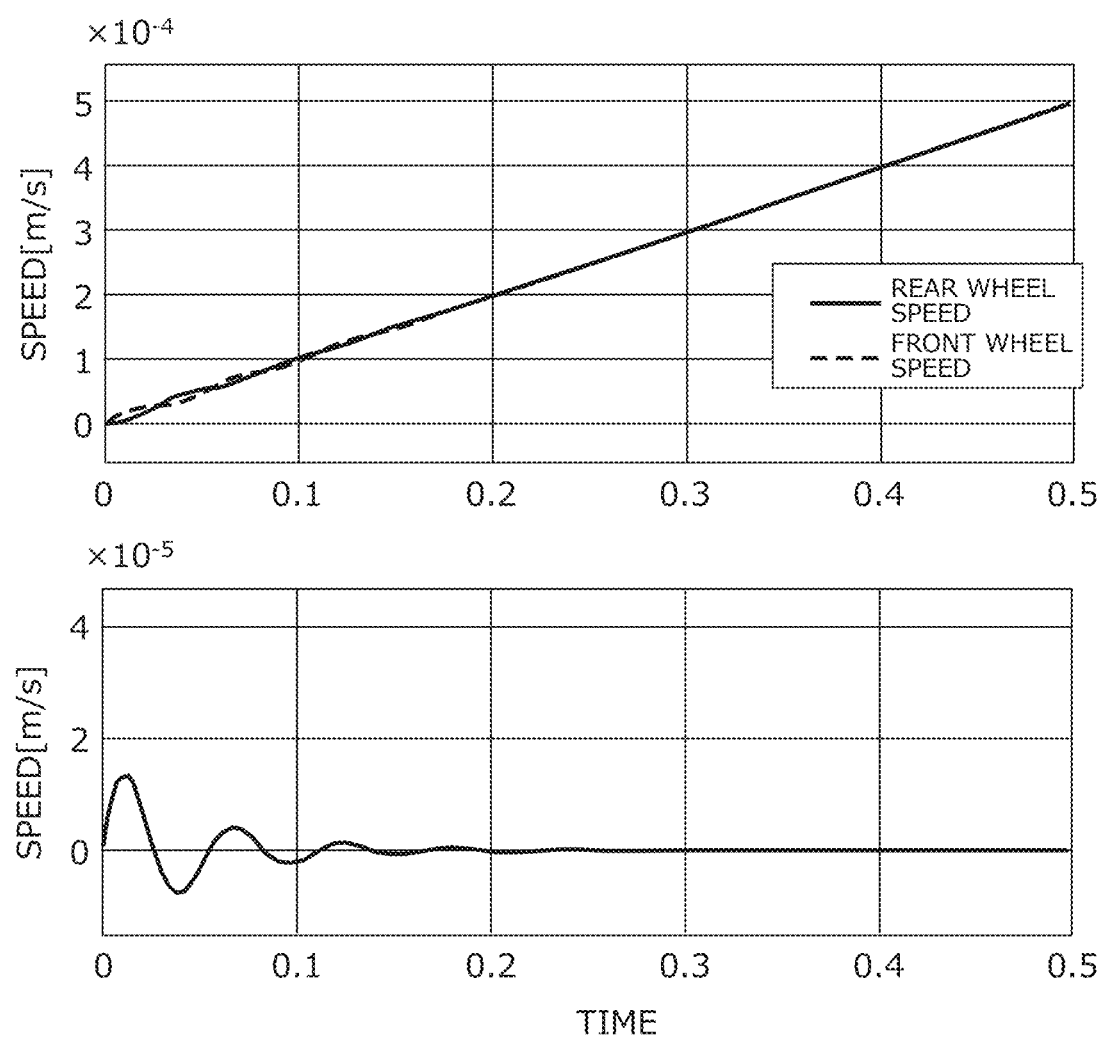
FIG. 4 is a diagram showing changes in a front wheel speed and a rear wheel speed (upper row) and in a speed difference between them (lower row) when synchronization control is performed with a conventional control device.

FIG. 3 is a diagram showing changes in the front wheel speed and the rear wheel speed (upper row) and in the speed difference (lower row) when synchronization control is performed with the control device 6 of the present embodiment. As in FIG. 4 described above, the example of FIG. 3 shows a case where the vehicle which generates the driving force in only the front wheel is used, and where the synchronization control is performed such that the rear wheel dynamometer is rotated with the control device 6 at the same speed as the front wheel dynamometer.

The synchronization control unit 63 is set such that all the poles of the denominator polynomial (8) in the transfer function from the generated driving force Fv to the speed difference (vf−vr) are negative real numbers, that is, that all the poles are not oscillatory. In the control device 6 of the present embodiment, the synchronization control unit 63 set as described above is used so as to generate the front wheel and rear wheel torque command signals Ff and Fr and to input them to the inverters 5f and 5r of the front wheel and rear wheel dynamometers 2f and 2r. In this way, as is clear from the comparison of FIGS. 3 and 4, it is possible to prevent the occurrence of an oscillatory behavior in the speed difference between the front wheel speed and the rear wheel speed as the control response to the generated driving force which is generated in the front wheel of the vehicle.

(2) In the control device 6 of the present embodiment, the speed difference is input to the transfer function Gd(s) specified by formula (3) above using the two synchronization control gains Kp and Ti so as to generate the synchronization control torque command signal Fd, and these two synchronization control gains Kp and Ti are set such that all the poles of the denominator polynomial (8) in the transfer function from the generated driving force to the speed difference are negative real numbers. In this way, it is possible to rapidly eliminate the speed difference (vf−vr) while an oscillatory behavior is being prevented from occurring in the speed difference (vf−vr) for the generated driving force Fv which is input from the vehicle V to the front wheel and rear wheel rollers 1f and 1r.

(3) In the control device 6 of the present embodiment, the two synchronization control gains Kp and Ti are set with the front side mechanical inertia Mf and the rear side mechanical inertia Mr which can be previously measured and the control response frequency ωc which can be arbitrarily set by formulas (4-1) and (4-2) above. As described above, these formulas (4-1) and (4-2) are one of such solutions that all the poles of the denominator polynomial (8) described above are negative real numbers. Hence, in the control device 6 of the present embodiment, it is possible to eliminate the speed difference with the response speed corresponding to the control response frequency ωc which can be arbitrarily set while an oscillatory behavior is being prevented from occurring in the speed difference.

Although the embodiment of the present invention has been described above, the present invention is not limited to this embodiment. The configurations of details may be modified as necessary without departing from the spirit of the present invention.

For example, although in the chassis dynamometer system of the embodiment described above, a first wheel is set to the front wheel Wf and a second wheel is set to the rear wheel Wr, and thus an oscillatory behavior is prevented from occurring in the speed difference between the front wheel Wf and the rear wheel Wr, the present invention is not limited to this configuration. For example, the first wheel is set to the left wheel of the vehicle and the second wheel is set to the right wheel of the vehicle, and thus an oscillatory behavior can be prevented from occurring in the speed difference between the left wheel and the right wheel.

Although in the chassis dynamometer system of the embodiment described above, the case is described where the front wheel roller and the rear wheel roller are used as the first driven member and the second driven member on which the front wheel Wf and the rear wheel Wr are respectively placed and which are respectively driven by rotations of the front wheel Wf and the rear wheel Wr, the present invention is not limited to this case. As the first and second driven members, for example, a front wheel flat belt and a rear wheel flat belt which are rotated according to the rotations of the front wheel Wf and the rear wheel Wr may be used.

EXPLANATION OF REFERENCE NUMERALS

S: chassis dynamometer system
V: vehicle
Wf: front wheel (first wheel)
Wr: rear wheel (second wheel)
1f: front wheel roller (first driven member)
1r: rear wheel roller (second driven member)
2f: front wheel dynamometer (first dynamometer)
2r: rear wheel dynamometer (second dynamometer)
3f: front wheel speed sensor (first speed sensor)
3r: rear wheel speed sensor (second speed sensor)
6: control device
61: driving force observer (driving force estimator)
62: electrical inertia control unit (torque command signal generator)
63: synchronization control unit (synchronization correction signal generator)
64f: front wheel torque command signal generator (first torque command corrector)
64r: rear wheel torque command signal generator (second torque command corrector)

The invention claimed is:

1. A control device of a dynamometer system that includes: a first driven member and a second driven member on which a first wheel and a second wheel of a vehicle are respectively placed and which are respectively driven by rotations of the first wheel and the second wheel; a first dynamometer and a second dynamometer which are respectively coupled to the first and second driven members; and a first speed sensor and a second speed sensor which respectively detect speeds of the first and second dynamometers,
the control device comprising: a driving force estimator which estimates a generated driving force of the vehicle;
a torque command signal generator which generates a first torque command signal for the first dynamometer and a second torque command signal for the second dynamometer using the generated driving force that is estimated by the driving force estimator;
a synchronization correction signal generator which generates a first torque correction signal for the first torque command signal and a second torque correction signal for the second torque command signal so as to eliminate a speed difference between a first speed detected with the first speed sensor and a second speed detected with the second speed sensor;
a first torque command corrector which corrects the first torque command signal using the first torque correction signal; and
a second torque command corrector which corrects the second torque command signal using the second torque correction signal,
wherein the synchronization correction signal generator is defined such that all poles of a denominator polynomial in a transfer function from the generated driving force to the speed difference are negative real numbers.

2. The control device of the dynamometer system according to claim 1, wherein a transfer function Gd(s) from the speed difference to the first torque correction signal and the second torque correction signal in the synchronization correction signal generator is provided with a first synchronization control gain Kp and a second synchronization control gain Ti by formula (1) below, and
the first synchronization control gain Kp and the second synchronization control gain Ti are defined such that all the poles of the denominator polynomial in the transfer function from the generated driving force to the speed difference are negative real numbers.

$$Gd(s) = Kp \cdot \frac{Ti \cdot s + 1}{Ti \cdot s} \quad (1)$$

3. The control device of the dynamometer system according to claim 2, wherein the first synchronization control gain Kp and the second synchronization control gain Ti are provided with inertia Mf resulting from addition of the first driven member and the first dynamometer, inertia Mr resulting from addition of the second driven member and the second dynamometer and an arbitrary control response frequency ωc by formulas (2-1) and (2-2) below.

$$Kp = \frac{2 \cdot Mf \cdot Mr \cdot \omega c}{Mf + Mr} \quad (2\text{-}1)$$

$$Ti = \frac{2}{\omega c} \quad (2\text{-}2)$$

\* \* \* \* \*